Jan. 31, 1950         W. R. KING         2,496,055
HOUSEKEEPING, TURTLEBACK TRAILER
Filed July 5, 1946         2 Sheets-Sheet 1
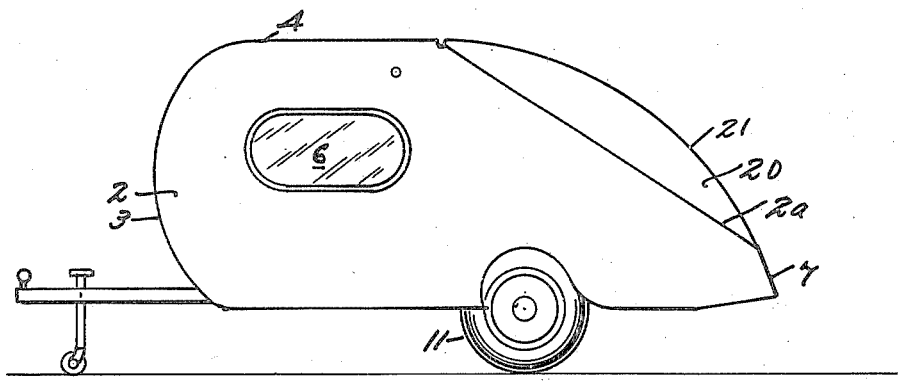
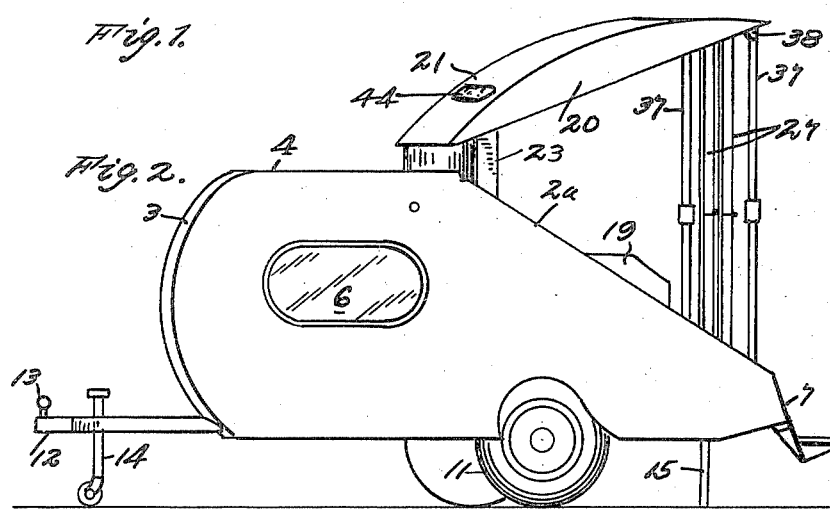
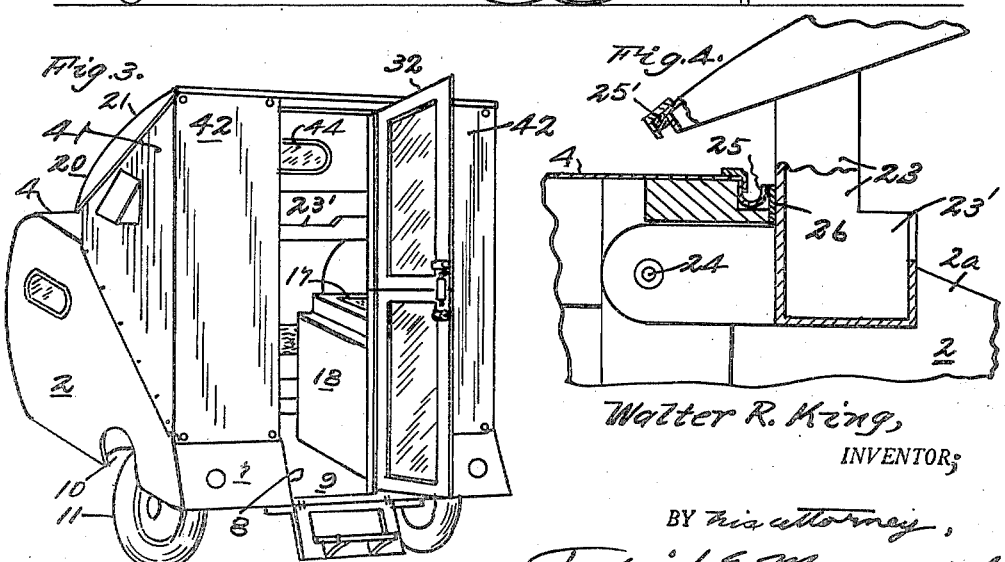
Walter R. King,
INVENTOR
BY his attorney,
Frederick E. Maynard.

Jan. 31, 1950 W. R. KING 2,496,055
HOUSEKEEPING, TURTLEBACK TRAILER
Filed July 5, 1946 2 Sheets-Sheet 2
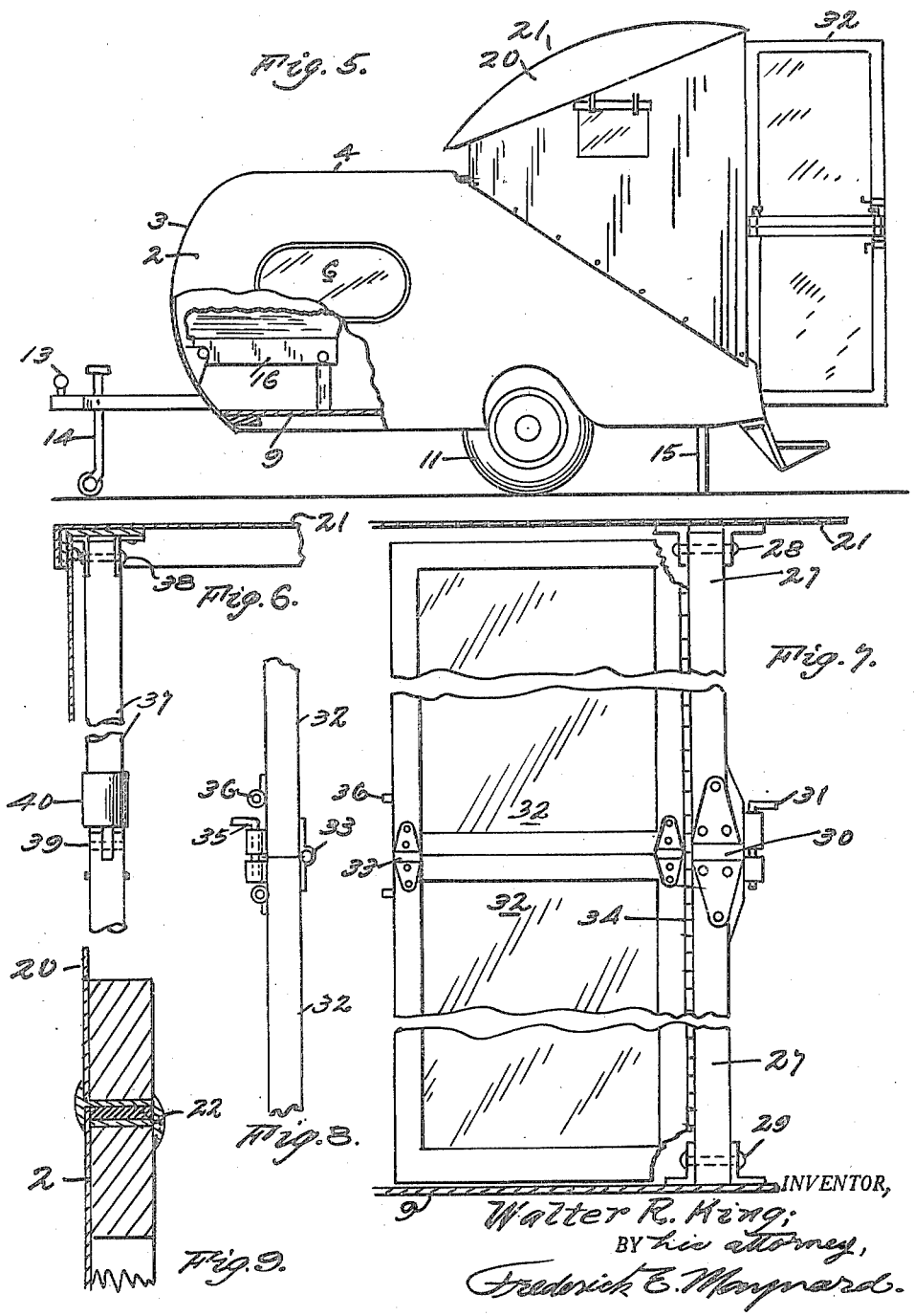
INVENTOR,
Walter R. King;
BY his attorney,
Frederick E. Maynard.

Patented Jan. 31, 1950

2,496,055

UNITED STATES PATENT OFFICE 2,496,055

HOUSEKEEPING, TURTLEBACK TRAILER

Walter R. King, Torrance, Calif.

Application July 5, 1946, Serial No. 681,504

3 Claims. (Cl. 296—23)

This invention is a house-keeping trailer for automobiles and incorporates a body of the so called "turtle back" type.

Heretofore trailers intended for house-keeping purposes rather than for the mere carrying of luggage and camping equipment as is the purpose of turtle back trailers have been very heavy, bulky and, particularly, of very considerable cost, and their great length is a material objection.

Therefore a particular object of the present invention is to provide a turtle back trailer in which there is a compartment of considerable size in which two or more people may comfortably stand erect for comfortable dressing and carrying on normal house-keeping, including cooking, meal service and dish washing in a manner not possible in turtle back trailers now generally in use.

And, in this connection, it is an object of the invention to provide a turtle back trailer which will be sufficiently commodious for house-keeping and yet will be reasonably light in weight and of medium cost at retail, of substantial and highly practical construction, and include a full size or double bed, a cook stove and utensil cabinets, and a kitchen sink and water supply, and other useful features.

Another object of the invention is to provide a turtle back trailer whose front end body structure comprises a rigid wall fore roof combined in a substantial bunk unit of a width for a full length bed transverse to the body and in which the rigid roof feature is well above the bed in a manner to provide ample head space for a person sitting on the bed.

A further object of the invention is to provide a turtle back trailer body structure including a fore, rigid roof, over a bed compartment and rearwardly of the rigid roof a rear end hood which is adapted to be elevated from a trailer closing, roof meeting position up to a desired height as to the body to afford a rear end service compartment in which occupants may stand erect under the raised hood for dressing or doing of house work incident to the use of the auto-drawn trailer on long trips, as distinguished from mere camping, an important purpose of the invention being to provide a trailer which will eliminate the need of spending time for hunting for house accommodations, or making reservations therefor, and still keep the cost of the trailer well within the purchase range of people of ordinary financial range.

An additional object of the invention is to provide a turtle back trailer having a house-keeping compartment provided with a full height door preferably in the rear wall part of the trailer so that ingress and egress may be had by people of average height without need of crouching or stooping. In this connection, an object is to provide a rear wall frame of collapsible construction and which has the dual purpose of serving as a support for the elevated, movable roof section or hood and for the mounting of a swinging and foldable rear door for the standing room compartment.

The invention resides in numerous advancements in this art as set forth in the ensuing disclosure and has, with the above, additional objects and advantages as will hereinafter develop, and whose constructions, combinations and details of means, and the manner of operation will be made manifest in the following description of the herewith illustrative embodiment; it being understood that modifications, variations and adaptations may be resorted to within the scope, spirit and principles of the invention as it is claimed in conclusion hereof.

Figure 1 is a side elevation of the trailer with its hood closed.

Figure 2 is a perspective view of the trailer with its hood erected.

Figure 3 is a rear end perspective view of the set up and walled trailer.

Figure 4 is a detail section of the hood elbow mounting.

Figure 5 is a side elevation of the trailer partly broken away to show the bed compartment, and the walled up rear compartment.

Figure 6 is a detail of the brace pole.

Figure 7 is an elevation of the erected door and its right side supporting stud.

Figure 8 is a detail of the left edge of the erect door and its bolt and hinge features.

Figure 9 is a detail section of the wall and panel joint seal.

A great advantage obtained by the compact construction of the instant trailer is that its weight is kept in such a range that no extra brake provision must be employed for control of the combined motor-vehicle and trailer.

Further, an advantage is that by the stream-lined shape and the low height of the closed (hood down) trailer, even though constructed for house-keeping, wind resistance is kept efficiently of low degree so that but little additional effort is placed on the tow car.

The trailer as illustrated incorporates a stream-lined body structure having like right and left side walls 2 of any suitable material and dimensions, and rigidly connected across the front end by a semicylindrical wall 3 curving upwardly and rearwardly and merging into a flat, forward roof 4 rigidly connected to top, straight corner edges of the stiff side walls. Side windows 6 are provided in the side walls in a location below the roof 4.

From the line of the rear edge of the roof the top edges of the walls 2 extend down to and rigidly join a transverse tail panel 7, Fig. 3, having a central opening 8 for ingress and egress to the living compartment of the trailer; this being provided with a substantial and commodious floor 9, end to end of the body.

The rear portion of the body has wheel houses 10 just inside the walls 2 in which are suitably mounted running wheels 11, and forwardly from the body extends a suitable tongue 12 with a device 13 for swivel attachment of the trailer to any suitable type of tractor; commonly an automobile, whereby the trailer may be towed to destination, and set up for camping or house-keeping. A swivel prop 14 on the tongue 12 can be lowered at will to support the front end of the trailer if and when the towing automobile is unhitched for other use, and suitable jack legs 15 are provided on the rear end of the body to be brought into use if it is desired to take the load off the wheels 11.

The space in the front end of the trailer is provided with any suitable bed device 16 below the roof 4, and if desired the bed may be swung, on a longitudinal pivot axis when not in use to provide much available floor area. The bed extends longitudinally across the body of the trailer and is preferably of full (double bed) width. It is not essential in the production of a light weight and low cost house-keeping trailer, that the sleeping compartment be of full standing room height, and it is an important object of this invention to provide a trailer of the turtle-back type with a commodious rear-end living compartment in which the occupants may comfortably stand erect and have ample floor area for facile movements to the storage, cooking and service conveniences permanently built into this trailer; as the stove 17, bin 18, and water and sink box 19, Fig. 2.

To obtain the desired standing-room compartment at the rear of the vehicle and to secure a full height, rear entranceway and door therefor there is matched to the downwardly inclined top edges 2a of the side walls 2 segmental panels 20 whose top curved edges are rigidly, transversely joined by an arched hood 21 which extends, when in lowered closed position, from the rear end edge of the fixed roof 4 down to and overlaps the rim of the tail panel 7; the meeting edges of the hood and the walls and panels being suitably jointed and packed as at 22, Fig. 9, for weather resistance.

Means are provided to so connect the front end of the hood 21 that the hood can be bodily elevated well above the plane of the roof 4, Fig. 2, to derive the wanted head space in the rear end of the trailer, and as seen in Fig. 4 this elevating means involves a pair of stiff elbows 23 having coaxial pivots 24 in the side walls 2 at such a point below the rear edge of the roof 4 that the hood can be disposed in a closing position, Fig. 1, onto the wall edges 2a to be flush with the roof and pitch down to the rear and meet the tail panel, thus effecting the stream-lining of the body, longitudinally. Or the hood can be elevated with its front edge well higher than the roof and pitching upwardly, Figs. 2 and 3; the arch of the hood 21, as to its chordal line, giving much head clearance.

The elbows 23 are rigidly cross-connected by a cabinet 23' giving much storage space.

When the hood is in lowered position a packing strip 25' on its front edge seals on a gutter strip 25 along the rear edge of the fixed roof 4, and in the raised position of the hood a wall of the cabinet 23' laps on a weather strip 26 to make a tight joint.

Collapsible means are provided having the several purposes of rigidly supporting the elevated hood; of forming a folding door frame, at the rear end of the body of the trailer, and for the easy and secure attachment of any suitable, rear compartment enclosure or siding. This means includes a suitably spaced pair of door frame studs 27 having top hinges 28, Fig. 7, secured to the rear portion of the hood, and bottom hinges 29 to the floor 9, and these studs have medially located, knuckle joints 30 permitting the studs to be folded into the body space for the lowering of the erected hood. When the stud 27 is erected to vertical position a locking bolt 31 is inserted to prevent the sectional stud from knuckling at the joint until released again.

Fitted between the frame studs 27 and extending from the elevated hood 21 and connected to one of the studs is a sectional door 32 having meeting rails which are jointed by knuckle hinges 33, Fig. 7 coaxial with the stud joints 30 so that the sections of the door are set up or infolded at the same operation of the studs. One side of the sectional door 32 has a piano-type hinge 34 interrupted at the axis line of the said knuckle joints to permit the folding and setting up of the door, this having bracing bolt 35 to lock the door erect. The swinging edge or side of the door has a cross-bolt device 36 to lock the erected door to the stud at the swinging edge of the door. The door panels may be glazed or screened, as desired, or both, for light and ventilation. In addition to the studs 27 knuckle-jointed corner poles 37 are hinged at 38 to the rear corners of the hood 21 and at their lower ends are stood securely in any suitable manner on the rear corners of the body structure so that these poles can be easily set up as soon as the hood is raised. At the knuckle joints 39 of the poles are suitable fasteners such as sleeves 40 to hold the pole sections erect, Fig. 6.

After the hood 21 has been raised and the studs and poles have been set and fastened, suitable side wall and rear wall closing means are applied to the hood and rear end portion of the trailer walls 2 and the tail panel 7. While this rear compartment closure may consist of various stiff panel parts the closure preferably consists of right and left side, triangular, weather-resistive fabric sheets; the left side one 41 being shown in Fig. 3 and including a full height rear end panel 42. These closure sheets are secured in any approved weather stopping manner to the under side of the adjacent margins of the hood and of the main walls 2 and tail panel. To meet bad weather conditions the rear door 32, if of screen type, may be covered with a fly sheet (not shown).

The wall sheets 41 may if desired be of a good quality netting, which can be covered with rain sheets when needed. The dismounted closure walls 41 can be very compactly folded and snugly stored in the trailer during transit, or while not in compartment forming use on the vehicle.

A top window 44 provides for forward view from the trailer when the hood is erected.

The entrance opening 8 of the tail board or panel 7 is closeable by an entrance step 8s hinged to the room floor.

What is claimed is:

1. A turtle-back, trailer car structure comprising a wheeled body having a coplanar floor with side walls and a forward end wall, a roof fixed to the said side and end walls and which covers sufficient of the forward portion to form a sleeping room section in the trailer of less than adult-standing height, a support, in the front portion of said section, for a bed extending lengthwise between the said side walls, a hood hingedly connected at its front end to and on an axis along the adjacent rear end structure of the fixed roof, the hood being adjustable upward to form an adult-standing and living room space rearward of the fixed roof section; the side walls having their top edges sloped downward from the fixed roof and said hood being generally of conformative structure therewith whereby to constitute, when in lowered position, a closure on the side walls and tilting down from the top plane of the said roof, and rear end closure means for the space below the raised hood and including a folding door frame hinged to the rear portion of the floor.

2. The trailer of claim 1; the frame being also hinged to the rear edge of the said hood.

3. The trailer of claim 1; the door frame being of inter-hinged upper and lower sections to knuckle fold into the room as the hood is lowered.

WALTER R. KING.

REFERENCES CITED

The following references are of record in the file of this patent:

UNITED STATES PATENTS

| Number | Name | Date |
| --- | --- | --- |
| D. 144,748 | Weissberg | May 14, 1946 |
| 1,386,943 | Moore | Aug. 9, 1921 |
| 2,101,748 | Michel et al. | Dec. 7, 1937 |
| 2,119,154 | Downing | May 31, 1938 |
| 2,168,661 | Anderson et al. | Aug. 8, 1939 |
| 2,202,747 | Roloson | May 28, 1940 |
| 2,225,993 | Hornberger | Dec. 24, 1940 |
| 2,293,569 | Sonino | Aug. 18, 1942 |